(12) United States Patent
Buzzell et al.

(10) Patent No.: US 11,494,824 B2
(45) Date of Patent: Nov. 8, 2022

(54) SYSTEMS AND METHODS FOR USER PERSONALIZATION AND RECOMMENDATIONS

(71) Applicant: NBTV Channels, LLC, New York, NY (US)

(72) Inventors: Michael Leon Buzzell, Brooklyn, NY (US); Nicholas Theodore Buzzell, Brooklyn, NY (US)

(73) Assignee: NBTV CHANNELS, LLC, New York, NY (US)

( * ) Notice: Subject to any disclaimer, the term of this patent is extended or adjusted under 35 U.S.C. 154(b) by 0 days.

(21) Appl. No.: 16/908,166

(22) Filed: Jun. 22, 2020

(65) Prior Publication Data
US 2020/0402133 A1 Dec. 24, 2020

Related U.S. Application Data

(60) Provisional application No. 62/865,005, filed on Jun. 21, 2019.

(51) Int. Cl.
G06Q 30/00 (2012.01)
G06Q 30/06 (2012.01)
G09G 3/34 (2006.01)

(52) U.S. Cl.
CPC ..... *G06Q 30/0631* (2013.01); *G06Q 30/0633* (2013.01); *G06Q 30/0641* (2013.01); *G09G 3/3413* (2013.01); *G09G 2320/062* (2013.01)

(58) Field of Classification Search
CPC ........... G06Q 30/0641; G06Q 30/0643; G06Q 30/0631; G06Q 30/0255; G09G 3/3413; G09G 2320/062
See application file for complete search history.

(56) References Cited

U.S. PATENT DOCUMENTS

| | | | |
|---|---|---|---|
| 10,334,320 B2 | 6/2019 | Chesson | |
| 10,872,369 B1 * | 12/2020 | Kurani | G06Q 30/0631 |
| 2013/0085851 A1 * | 4/2013 | Pedro | G06Q 30/0255 705/14.53 |
| 2017/0339462 A1 * | 11/2017 | Clarke | H04N 21/44008 |

FOREIGN PATENT DOCUMENTS

| | | | | |
|---|---|---|---|---|
| WO | WO-2013126648 A1 * | 8/2013 | | G06Q 30/02 |
| WO | WO-2019191516 A1 * | 10/2019 | | G06K 9/00671 |

OTHER PUBLICATIONS

Kim, Hyun-Cheol, and Kyuheon Kim. "Development of interactive contents streaming system based on MPEG-4." The 6th International Conference on Advanced Communication Technology, 2004 . . . vol. 2. IEEE, 2004. (Year: 2004).*

* cited by examiner

*Primary Examiner* — Matthew E Zimmerman
(74) *Attorney, Agent, or Firm* — Ice Miller LLP

(57) ABSTRACT

Systems and methods for user personalization and recommendation schemes that are matched to a user profile and provide a highly personalized, interactive experience for the user on an entertainment platform are disclosed. In one aspect of the invention, the highly personalized and interactive experience is facilitated through information from the user profile comprised of user-inputted information, historical data, and outputs from machine learning engines. In another aspect of the invention, the system is capable of outputting the highly-personalized and interactive recommendations onto a viewing screen while media content is continuously streaming on the same viewing screen.

20 Claims, 13 Drawing Sheets

FIG. 11

SYSTEMS AND METHODS FOR USER PERSONALIZATION AND RECOMMENDATIONS

TECHNICAL FIELD OF THE DISCLOSED EMBODIMENTS

The present invention relates generally to systems and methods for user personalization and recommendation schemes that are matched to a user profile and provide a highly personalized, interactive experience for the user on an entertainment platform, whereby the highly personalized and interactive experience is facilitated through information from the user profile comprised of user-inputted information, historical usage data, and outputs from machine learning engines. In one embodiment of the invention, the system is capable of outputting the highly-personalized and interactive recommendations onto a viewing screen while media content is continuously streaming on the same viewing screen.

BACKGROUND OF THE DISCLOSED EMBODIMENTS

The average user may consume over nine (9) hours of media content per day within the increasingly vast and complex library of content and information available through a multitude of media providers. However, existing providers fail to deliver a level of customization that the user expects, and the new content discovery the user desires. Thus, a new system and method for connecting, customizing, and curating is desired.

Current entertainment platforms such as traditional broadcast television networks transmit content that is interrupted by intermittent commercial breaks that are minimally related to the user's preferences. Similarly, certain internet- and mobile-based entertainment platforms, including over-the-top ("OTT") streaming services like Hulu® and YouTube® similarly deliver content disrupted by intermittent advertisements, regardless of whether the content is viewed over a traditional web-browser, mobile device, or other platforms. However, these forms of advertisements are disruptive and undermine the user experience. Thus, there exists a need to provide an elevated way to deliver potential revenue-generating content to the entertainment platform in a way that is highly-personalized and minimally disruptive to the user.

SUMMARY OF THE DISCLOSED EMBODIMENTS

The present disclosure discloses systems and methods for user personalization and recommendations schemes that are matched to a user profile and provide a highly personalized, interactive experience for the user on an entertainment platform facilitated through the information from the user profile, resulting in a more comfortable, streamlined, and intuitive entertainment experience for the user. The highly personalized and interactive experience is facilitated through information from the user profile comprised of user-inputted information, historical usage data, and outputs from machine learning engines.

The systems and methods of the present invention include robust services that support curation, e-commerce, recommendations, addressable advertising, interactivity, adaptability to emerging technologies, changing market conditions, consumer trends, and hyper-personalization through targeted personalization of user-optioned selections, as well as historical usage data, and outputs from artificial intelligence ("AI")/machine learning ("ML") engines.

In at least one embodiment of the present disclosure, a hyper-personalized entertainment system and method is described, which seamlessly integrates services including streaming video and simultaneously providing non- and/or minimally-intrusive user-personalized recommendations that are displayed on the same user interface as the streaming video. These user-personalized recommendations include interactive options for the user, for example, options to view information about curated products and services, to place them onto a "locker", "wish list" or "cart," or to purchase the highly-curated products and services that are the subject of the content, for example, the option to place an order to purchase a particular alcohol or spirit while viewing a video about that alcohol or spirit.

In another aspect of the invention, the system sets-up a user profile derived from information provided by the user through data entry of information directly into the platform via the registration process, and continuously updates the user profile based on additional or modified information inputted by the user into the system, as well as historical usage data elements automatically recognized and applied by the system to the user profile, and output from AI and ML engines that identifies highly personalized items of interest.

In another aspect of the invention, the system and method curates and recommends products based on a user's profile. The user's profile may be comprised of information including the user's name, address, age, birthdate, location, budget, and other user-inputted preferences, such as preferred locations, preferred spirits, and preferred brands for the example of a spirits-based entertainment system, as well as information gathered through user behavior. Each of these information points, or data elements, are attributed a tag or meta-tag, which can then be run through an AI-based analytics system to predict the user's preferences and output product recommendations directly back to the user while he or she is viewing the content.

In another aspect of the invention, the system includes a number of AI and ML engines with a plurality of recommenders and related personalization schemes. Each recommender/personalizer engine identifies a different type of personalized recommendation for items and interactions within the platform such that the user has a highly-curated experience specific to his or her specific interest, desires, and wants. For example, one recommender/personalizer engine may identify and recommend types of food, and another recommender/personalizer engine may identify types of cars, based on the user profile.

In another aspect of the invention, the recommenders/personalizer engine also scores and weighs the candidate recommendations against a number of AL/ML models. In another aspect of the invention, the recommendation/personalization engine or candidate selector also outputs the recommendations or personalizations with associated reasons for the recommendation/personalization of the items. These outputs are part of an associated neural network with continuous, automated feedback loops which continue to refine the recommendations and personalizations for each user.

In another aspect of the invention, a computerized method for providing entertainment and e-commerce to a user through a user interface of a computing device is disclosed, the method comprising the steps of: streaming media content on the user interface, wherein the media content includes at least one trigger therein; and when the trigger occurs in the media content, displaying on the user interface information about a product or service that is available for purchase through the user interface, wherein the product or service is related to the streaming media content; wherein the streaming media content continues to be displayed in the user interface at the same time the information is being displayed; and wherein the user may use the user interface to perform an interactive function related to the product or service while the streaming media content continues to be displayed.

In another aspect of the invention, the media content comprises a video.

In another aspect of the invention, the product or service displayed comprises a product or service displayed in the streaming media content.

In another aspect of the invention, the information is displayed in the user interface by providing a display gradient over a portion of the user interface that highlights the information while still allowing the user to view the media content.

In another aspect of the invention, the display gradient incrementally increases or decreases in opacity across the user interface.

In another aspect of the invention, the display gradient comprises a top layer overlay in the user interface, the top layer overlay having a color that becomes increasingly darker across the user interface.

In another aspect of the invention, the interactive function is selected from the group consisting of: purchase the product or service, add the product or service to a virtual shopping cart, add the product or service to a wish list, or add the product or service to a virtual folder, which can later be viewed by the user for later decision-making.

In another aspect of the invention, the product or service is chosen at least in part based upon information supplied by the user.

In another aspect of the invention, the information is selected from the group consisting of: user name, user address, user birthdate, user age, user astrological sign, user financial budget, user location, user ethnicity, user travel preferences, user pet preferences, user music interests, user drink preferences, and user food preferences.

In another aspect of the invention, the product or service is chosen based at least in part on at least one component part of a product appearing in the media content.

Other embodiments are also disclosed.

BRIEF DESCRIPTION OF DRAWINGS

The present invention will become more fully understood from the detailed description and the accompanying drawings, wherein:

FIG. 11 is an example of a UI displaying additional details upon clicking into the wish list item.

DETAILED DESCRIPTION OF THE DISCLOSED EMBODIMENTS

For the purposes of promoting an understanding of the principles of the present disclosure, reference will now be made to various embodiments of the present disclosure, and specific language will be used to describe the same. It will nevertheless be understood that no limitation of the scope of this disclosure is thereby intended.

In at least one embodiment of the present disclosure, a system for enhancing a user's entertainment experience is comprised of an entertainment platform that is fully customizable and capable of capturing and analyzing user-based information to predict user-behavior and recommend highly-curated products, content, experiences or other services. In some embodiments, a user may enter data elements into the system as part of a user profile, including but not limited to the user name, address, birthdate, age, astrological sign, financial budget, location, ethnic and cultural makeup, and certain preferences, including travel preferences such as whether the user has a stronger propensity to travel to a certain region or destination over others (e.g., prefer the Bahamas over Greece), pet and music interests, drinks and food likes and pairings based on their molecular structure, and other user preferences.

Figure 1:
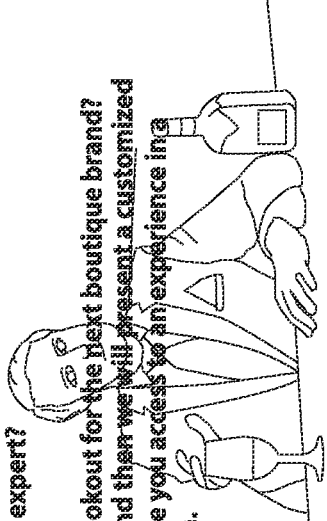
FIG. 1 is an example of a user interface ("UI") requesting user information for a platform related to spirits.

Selection options for user preferences may vary based on the purpose of the entertainment platform, but may include user preferences on atmosphere (e.g., quiet, loud, etc.), environment (e.g., sports venue, outdoors, restaurants, etc.), preferred beverages, food, and the like. An example of a User Interface ("UI") requesting this information for a platform related to spirits is shown in FIG. 1.

The platform may be viewed over an internet web-browser, a mobile device, or other outlets, including but not limited to Roku®, Amazon Fire®, Apple TV®, Vizio®, TiVo®, Western Digital®, Netgear®, smart TVs, including Samsung®, Panasonic®, LG®, and more. The entertainment platform is capable of streaming media content, including but not limited to video files of the user's preference. The entertainment platform may be highly specialized in some embodiments, for example, a channel devoted to high-end alcohol and spirit products, or may include multiple channels, or channels devoted to broader subject matter. Based on the subject matter and particular requirements of the subject matter, different user preferences may be selected. For example, in the case of alcohol or spirits, a user profile may include an age-gate, upon which those under the legally-required age may not be permitted to participate.

In some embodiments, during the streaming of the media content, the platform is capable of automatically displaying curated information when internally triggered by a certain aspect of the content, which may be configured in advance by the content provider in some embodiments. For example, in the spirits area, a content related to whiskey may trigger a certain whiskey's information to appear when that particular whiskey is mentioned in the content, either through visual, auditory, or other cues. The product information is displayed in such a way as to minimally disrupt the streaming of the content. This is achieved by, for example, providing a display gradient over a portion of the screen that highlights the product information while still allowing the user to easily view the content in some embodiments. The display gradient may gradually (incrementally) increase or decrease in opacity across the viewing screen. As one example, the display may appear visually darker in color and gradually become a more opaque variation of the same color. This may be accomplished, for example, by having a top layer overlay technique that brings more visual attention to the recommended items that are presented to the viewer.

Figure 2:
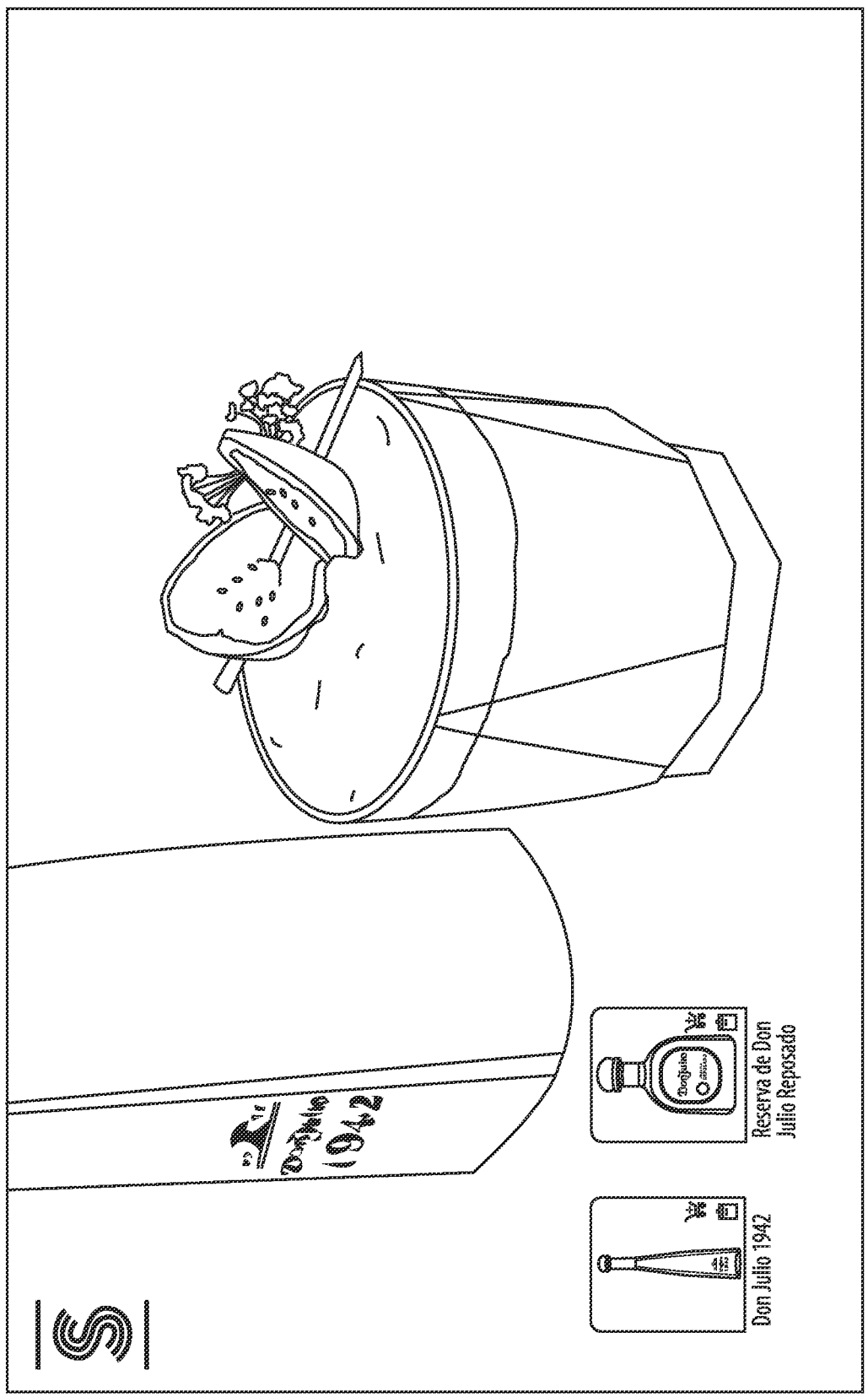
FIG. 2 is an example of a UI showing minimally disruptive interactive options that the user may use to interact with the system while continuing to view the content on the same viewing screen.

The product information may be displayed in a prominent, yet non-distracting position and size, for example, by displaying the product information in one corner or the lower or upper portion of the viewing screen, and having a gradient display to highlight the product while minimizing distraction for the viewer who may wish to continue to view the content on the same viewing screen. FIG. 2 shows an exemplary User Interface ("UI") demonstrating some of the above described capabilities.

Figure 3:
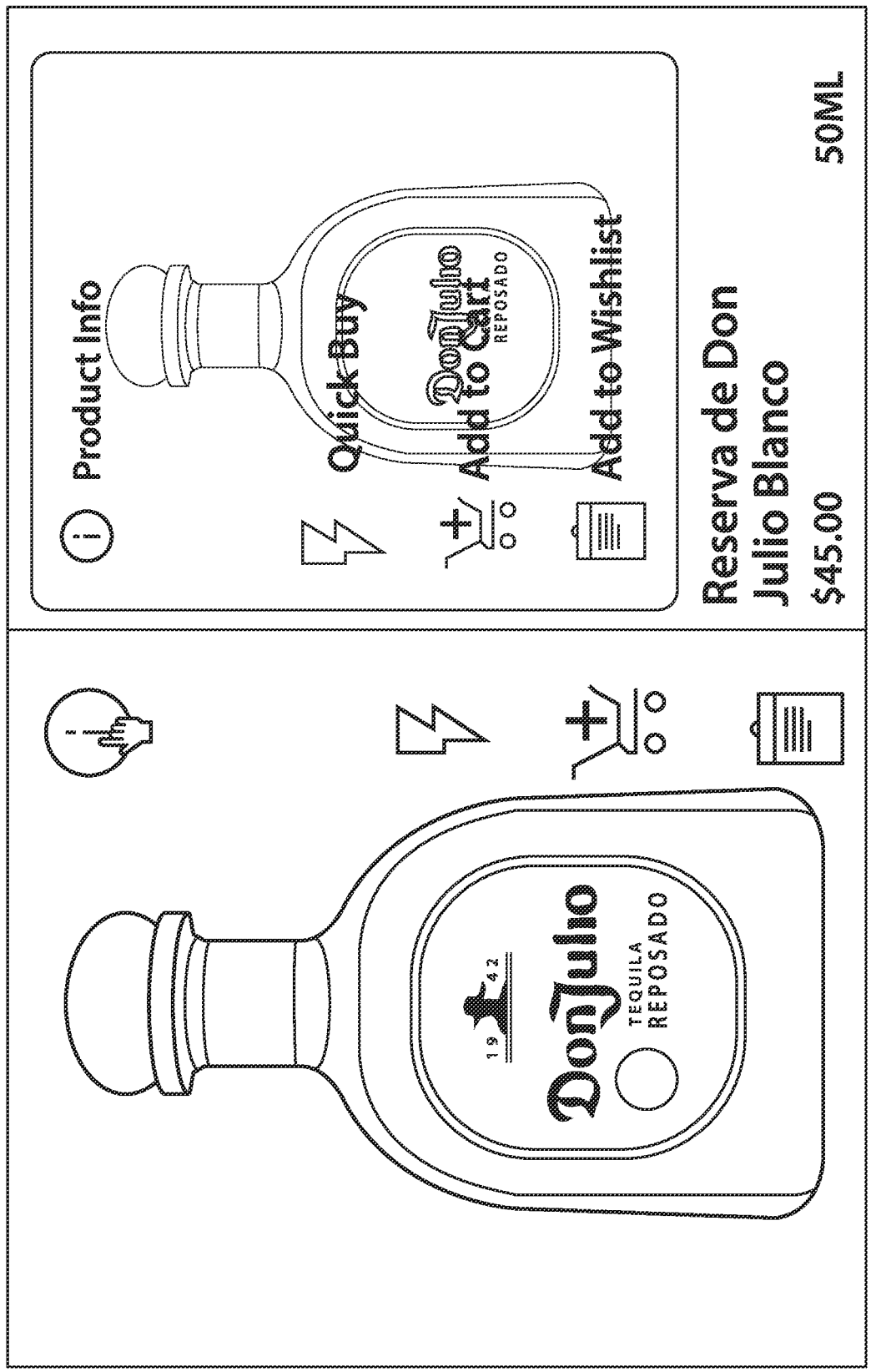
FIG. 3 is an example of a portion of a UI showing interactive options that the user may use to interact with the system.
Figure 4:
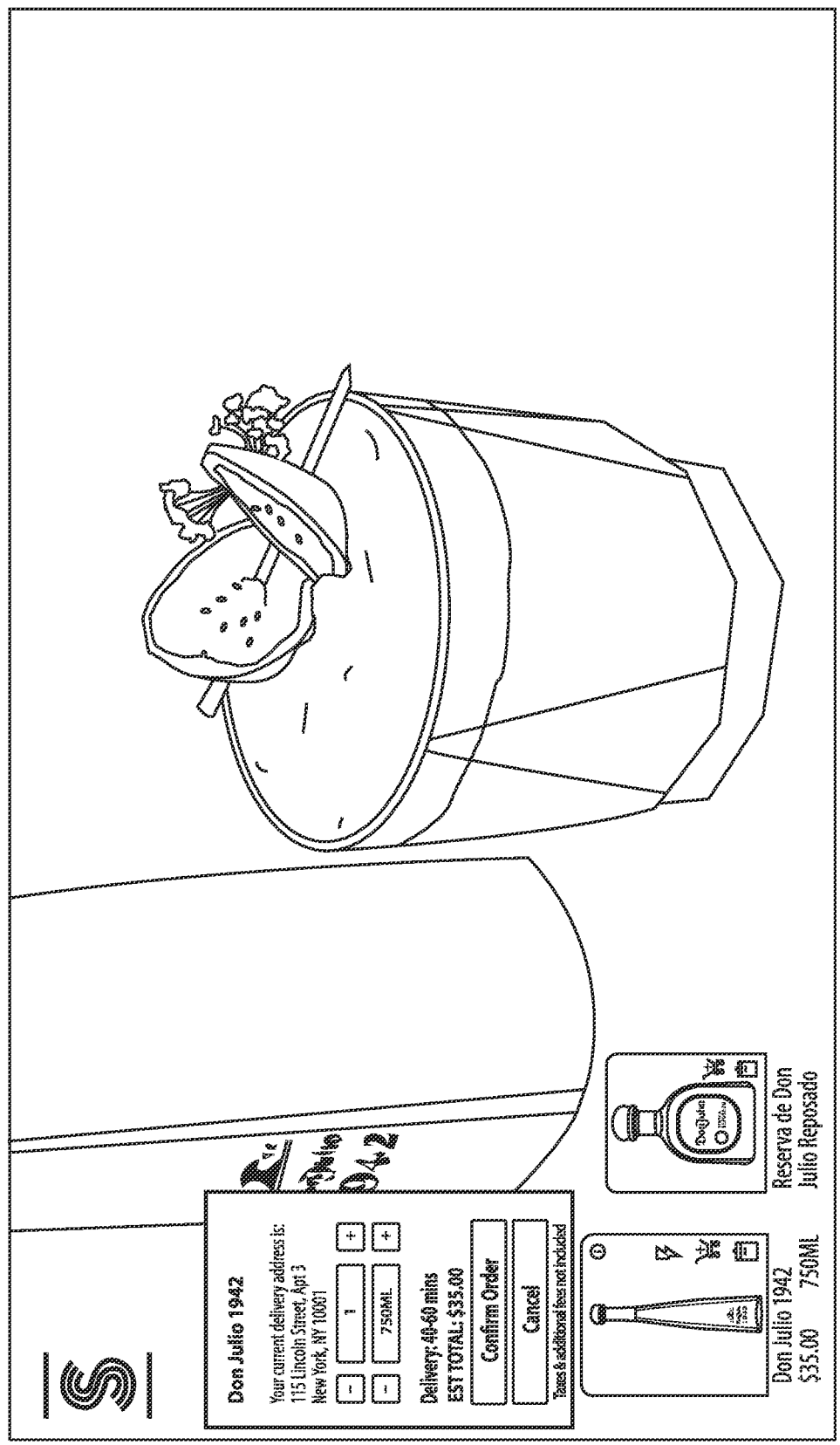
FIG. 4 is an example of a portion of a UI displaying product information and options.
Figure 5:
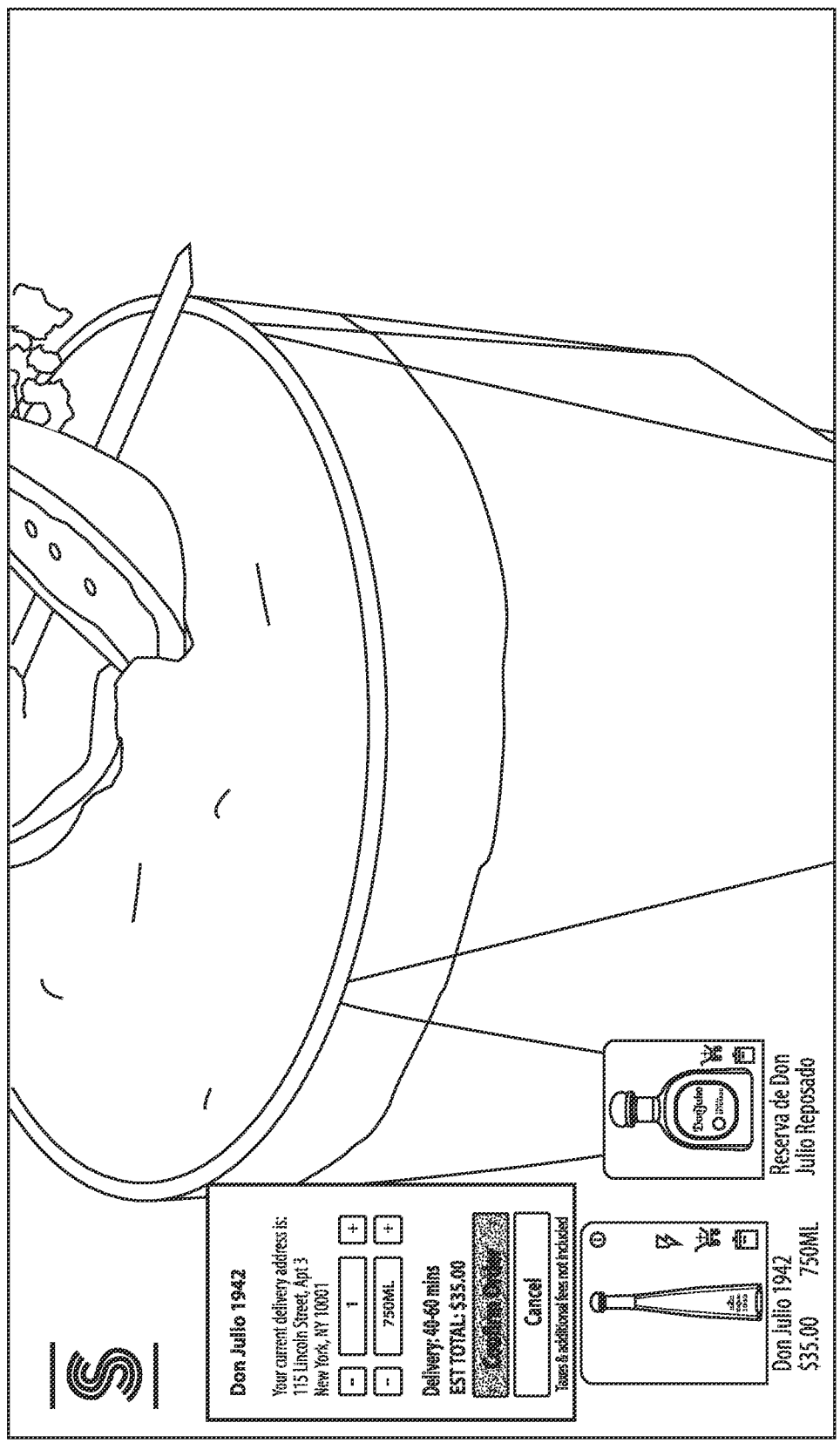
FIGS. 5-9 are examples of a portion of a UI displaying the various phases of purchasing within the streaming platform.
Figure 6:
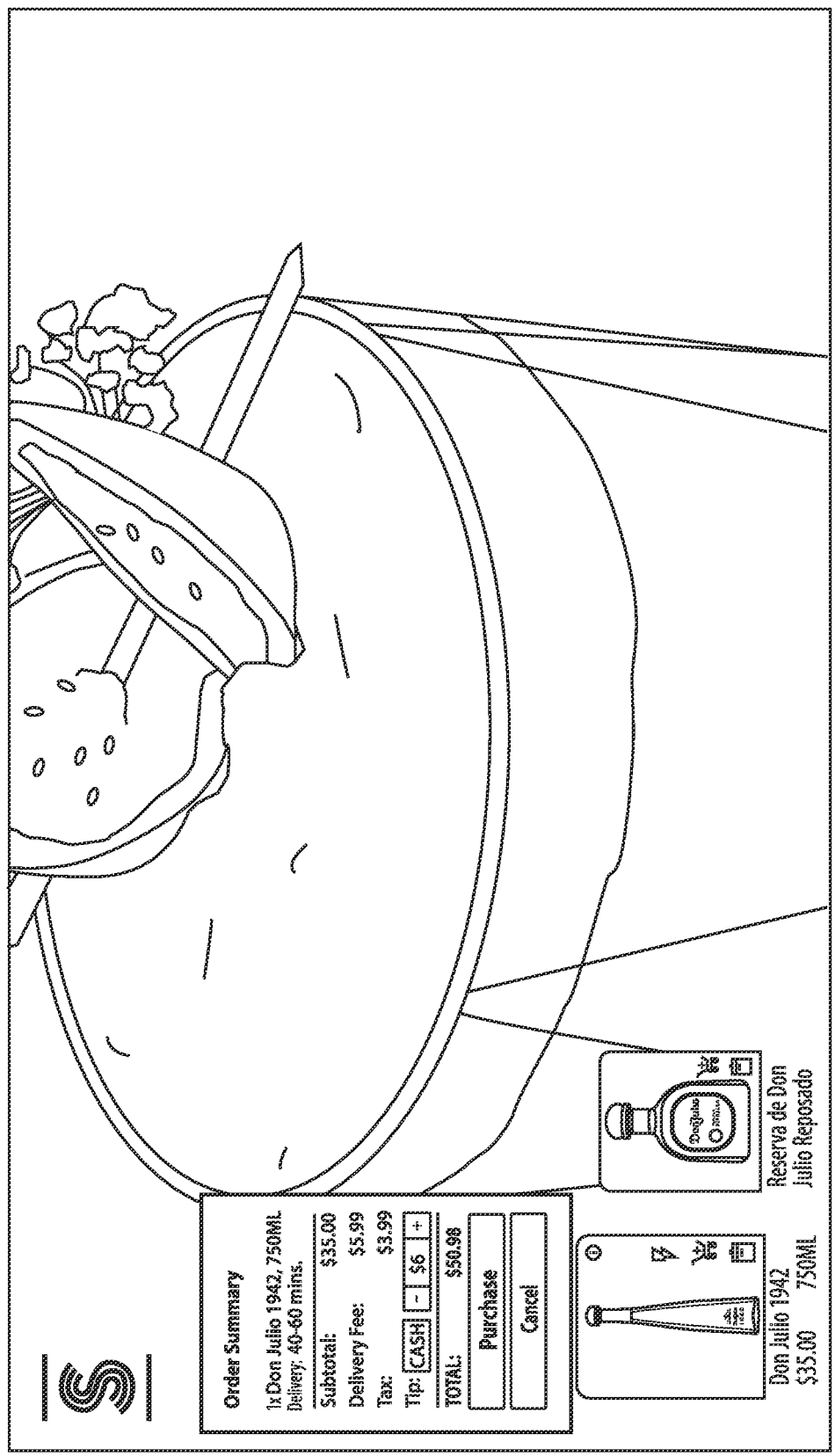
Figure 7:
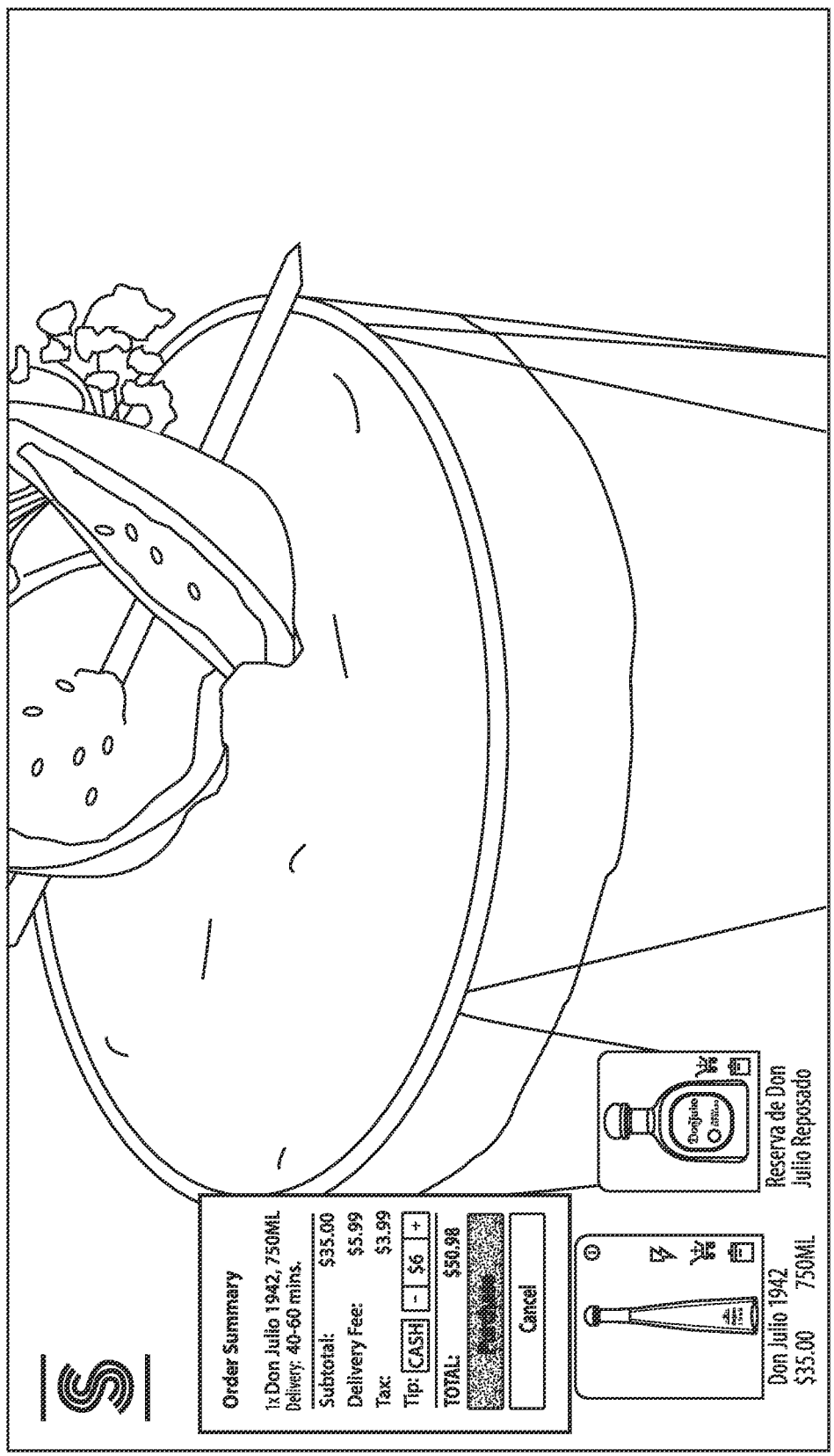
Figure 8:
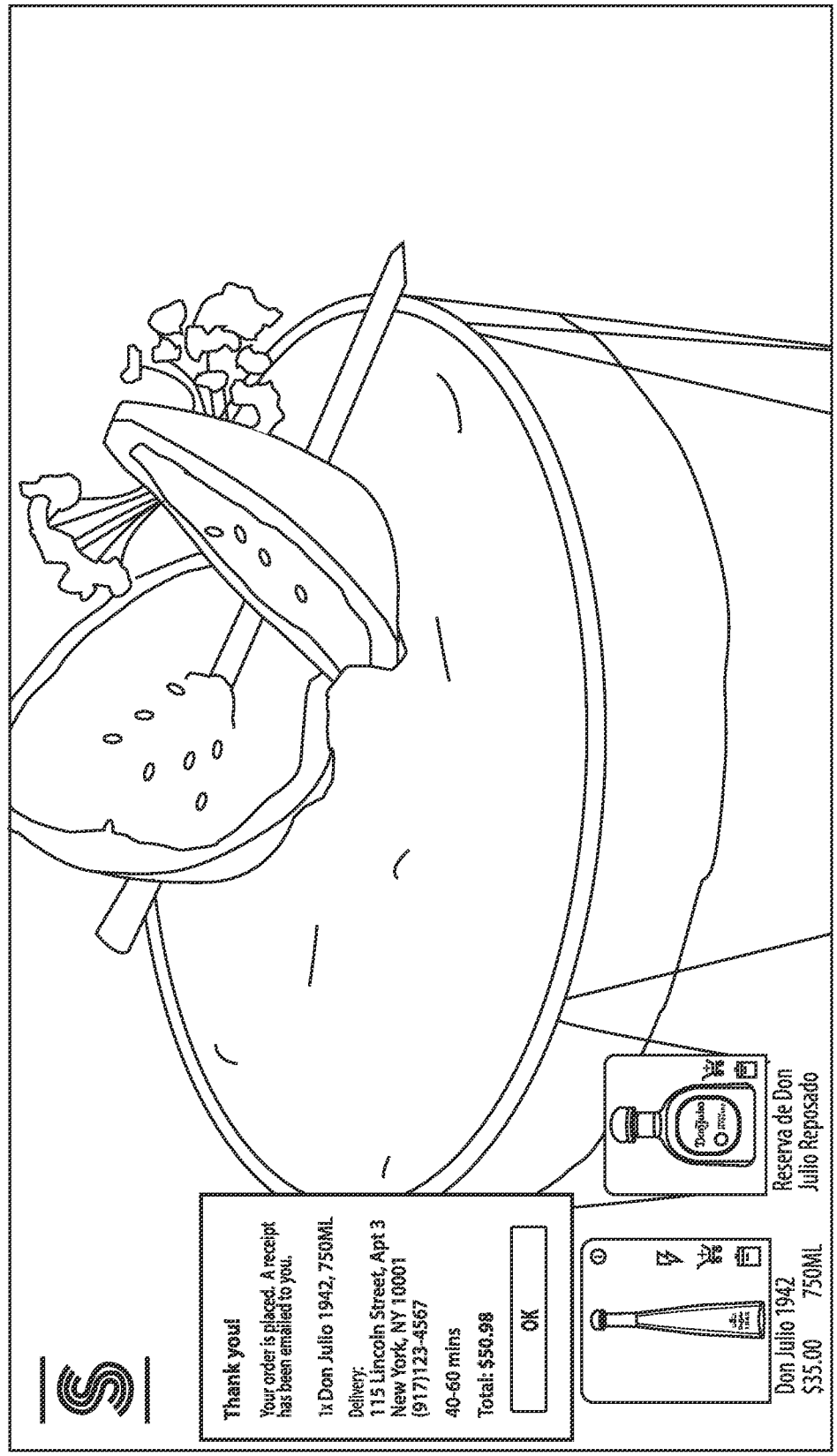
Figure 9:
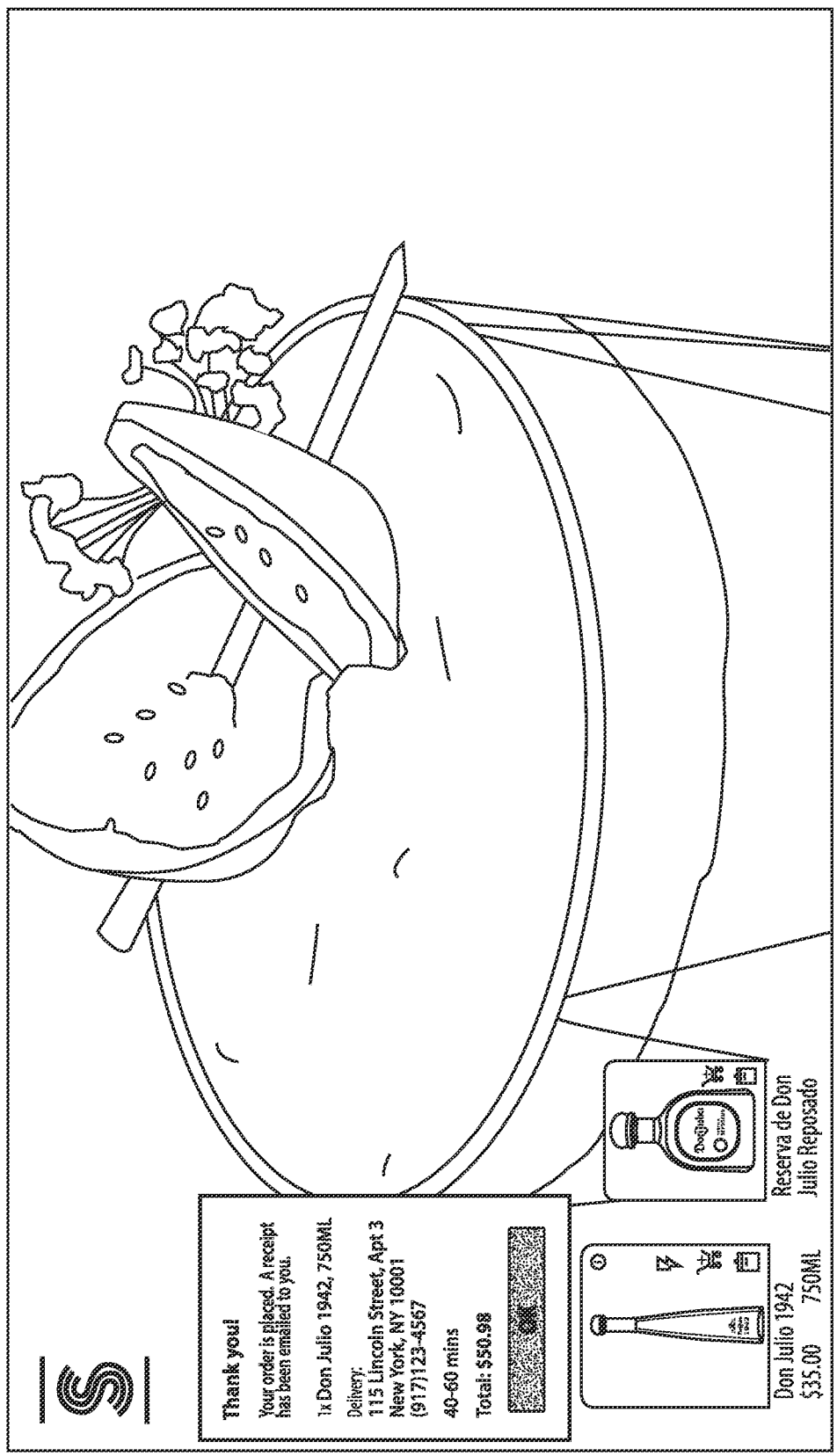
Figure 10:
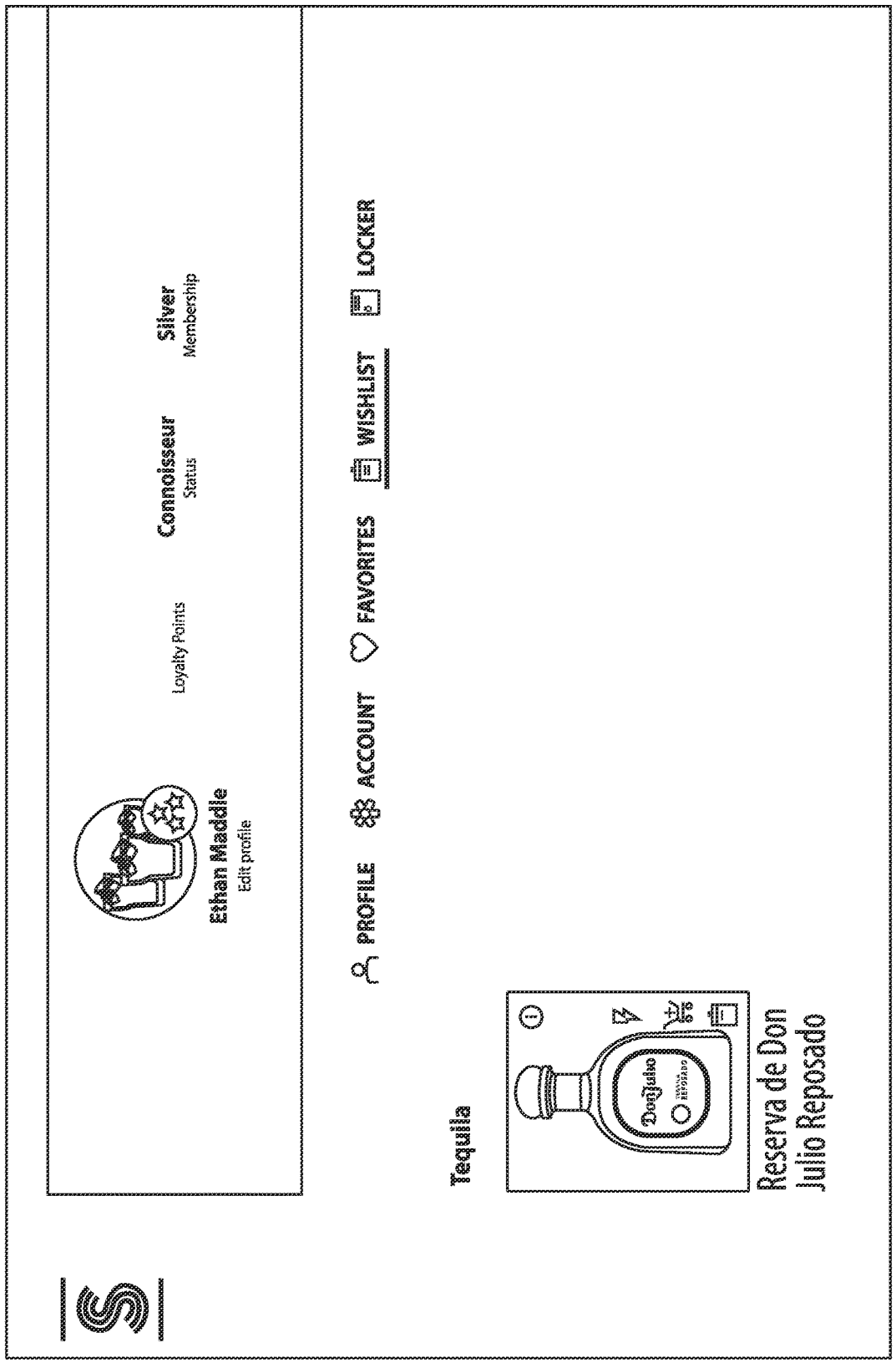
FIG. 10 is an example of a UI displaying the wish list.
Figure 11:
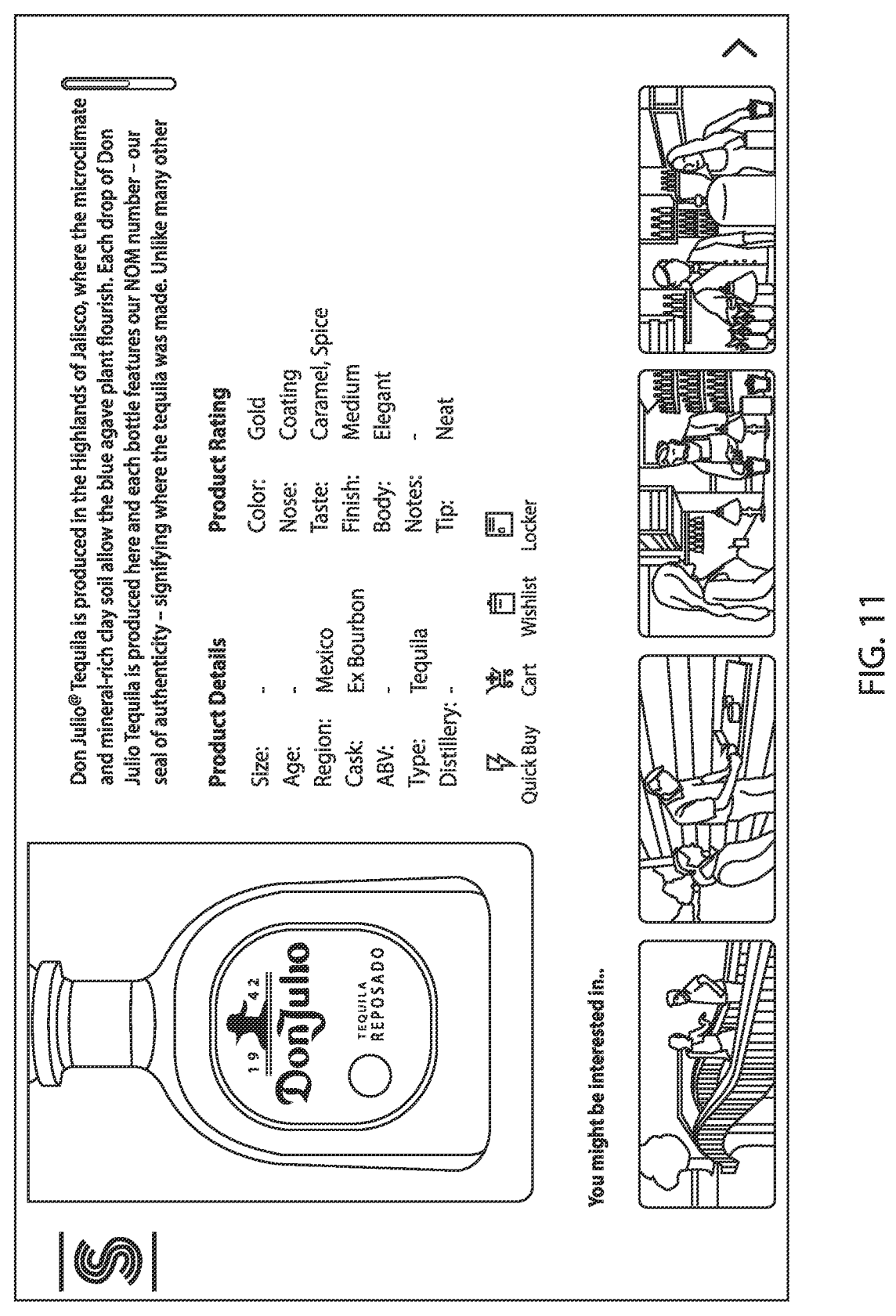
Figure 12:
FIG. 12 is an example of a UI displaying the quick-buy option within the wish list.

In some embodiments, the entertainment system described above includes interactive options associated with the product information that is displayed during the streaming of the media content on the same viewing screen. These include, for example, options to purchase the product, add it to a virtual shopping cart, add it to a wish list, or add it to another virtual folder, which can later be viewed by the user for later decision-making. In some embodiments, these options may be enabled by including an icon alongside the product information to easily allow the user to select the desired option, as shown for example in FIG. 3. In the example involving the option to purchase the product, a user who seeks to purchase a product associated with the content has the option to immediately purchase the product by selecting the quantity, confirming the displayed shipping address (previously supplied by the user in his profile) and then selecting the purchase option. FIGS. 4-9 illustrate one embodiment of this system and process. Once product information has appeared on the screen, a user may click, touch, hover, select, or otherwise indicate (depending on the platform) the sub-UI for additional options. For example, FIG. 4 shows that the user has selected the first curated product. Upon the user's selection of the "quick-buy" icon, additional product information is displayed, providing options for quantity and size of the product, as well as options to confirm or cancel the order. In addition, because the user has already entered certain information and preferences into his or her profile, information and preferences already known to the system are pre-populated and/or calculated, in this case, the delivery address, billing information, and other metrics required to complete the purchase, including an estimated delivery time of the product. FIG. 5 shows that the user has selected to confirm the order. FIG. 6 displays an Order Summary UI, which provides information summarizing the order, such as the name of the product, the quantity, size, delivery estimate, the price, as well as an option to tip, and finally an option to Purchase or Cancel the order. FIG. 7 shows that the user has selected to Purchase the order. FIG. 8 displays a UI confirming the purchase. FIG. 9 shows that the user has selected the OK icon, indicating acceptance of the order and confirmation. It may be appreciated in FIGS. 4-9 that while the user is receiving product information, deciding to purchase the product, placing the order, and receiving confirmation of the order and delivery estimate (all within a minimally disruptive interface), the content continues to stream, thus delivering uninterrupted content to the user. The user may alternatively place the product into his or her shopping cart, so that they may later confirm the purchase details and place the order. The user may alternatively place the product into the wish list, upon which the user can later decide whether to purchase the product. This product information interface is apparent during the same time the user is simultaneously viewing the content and on the same viewing screen as the streaming media content, thus, minimizing the disruptions to content delivery, and maximizing the ease at which a user may purchase products (or perform other secondary interactions with the UI, such as viewing additional information, populating a shopping cart, saving product information to a wish list, etc.). FIGS. 10-12 show how a product placed into a wish list may later be purchased.

In some embodiments, the entertainment system includes hyper-personalization schemes that provide targeted personalization based on user-optioned selections, social listening, content and context data analysis, and identified cross-channel insights. In one instance, the entertainment system and method curates and recommends products based on the user profile. The user profile may be comprised of data elements inputted by the user, and information collected through the user's interaction with the entertainment system, as collected and analyzed by the system. Each of these information points, or data elements, are attributed a tag or meta-tag, which can then be run through an artificial intelligence/machine learning ("AI/ML") based analytics system to further predict the user's preferences and output recommendations directly back to the user while he or she is viewing the content, thus providing a highly-personalized experience. In addition, each piece of media content may be attributed with certain metadata tag attributes like name, date, topic, and other unique attributes relevant to the curating process for a particular recommendation, such as for a particular product. These tags can then be linked to relevant products and further associated with certain users with preferences aligned with those attributes. As one example in the alcohol/spirits industry, a particular content such as a video about an alcohol originating from a Spanish-speaking country may have attributes associated with the content, including tags for languages, country of origin, or spirit-type. The tags or meta-tags are also capable of deep tagging, which provides a more granular level of identifying attributes of items and of content in the user profile. Such back-end information associated with the content may be linked to particular products and/or users, thus improving opportunities to provide better insights to the user and/or the content or product providers.

In some embodiments, the highly personalized and interactive experience is facilitated through the information from the user profile comprised of user-inputted information, historical data, and information created by ML engines. The user's profile is derived from information provided by the user through data entry of information directly into the platform via the registration process and/or later entries and adjustments, updates into their profile as well as historical usage data elements automatically associated with their profile by the system.

In some embodiments the historical data includes both application/platform specific direct user activity data and profile-provided data, as well as external data and data groupings that are related to each user by virtue of how they are manually or algorithmically grouped in accordance with the overall profile segments in relation to other user profiles that are grouped with similar attributes. Each attribute is aligned with a corresponding base hypothesis that is either programmed or derived through machine learning models and then capable of evolving as it learns more about a user's or group (cohort) of users' activities over time. For example, if it is discovered that a significant percentage of users who like Irish whiskey also like golf, then the system would be likely to recommend golf content to other users who have self-identified as liking Irish whiskey, but who have not self-identified a preference for golf.

In some embodiments, certain data elements such as user-inputted information including user name, birthdate, astrological sign, financial budget, geolocation, ethnic and cultural makeup, travel preferences, pet and music interests, drinks and food likes and pairings based on their component parts or molecular structure (for example in the spirits or food categories, subdividing attributes into their smaller parts to accomplish a better and more creative alignment of recommendations for flavor and taste pairings (those who like whiskey may enjoy other wood-aged spirits, those who like lasagna may enjoy other tomato-based pasta dishes, etc.)), are aligned with other data elements such as user likes and dislikes, colors, and smells, to create highly-personalized interactive experiences within the platform such as during video content watching, audio podcast listening, e-commerce purchases within the application, and select items to service the user in a highly personalized manner that include related recommendations. The system records the indicated preferences of all users by, for example, recording what items they purchase through the platform. If the system detects a correlation between preference for a certain product by users who are associated with the same astrological sign and the same ethnicity, then the system will recommend that product to other users who share that astrological sign and ethnicity (as determined by the user profiles).

Figure 13:
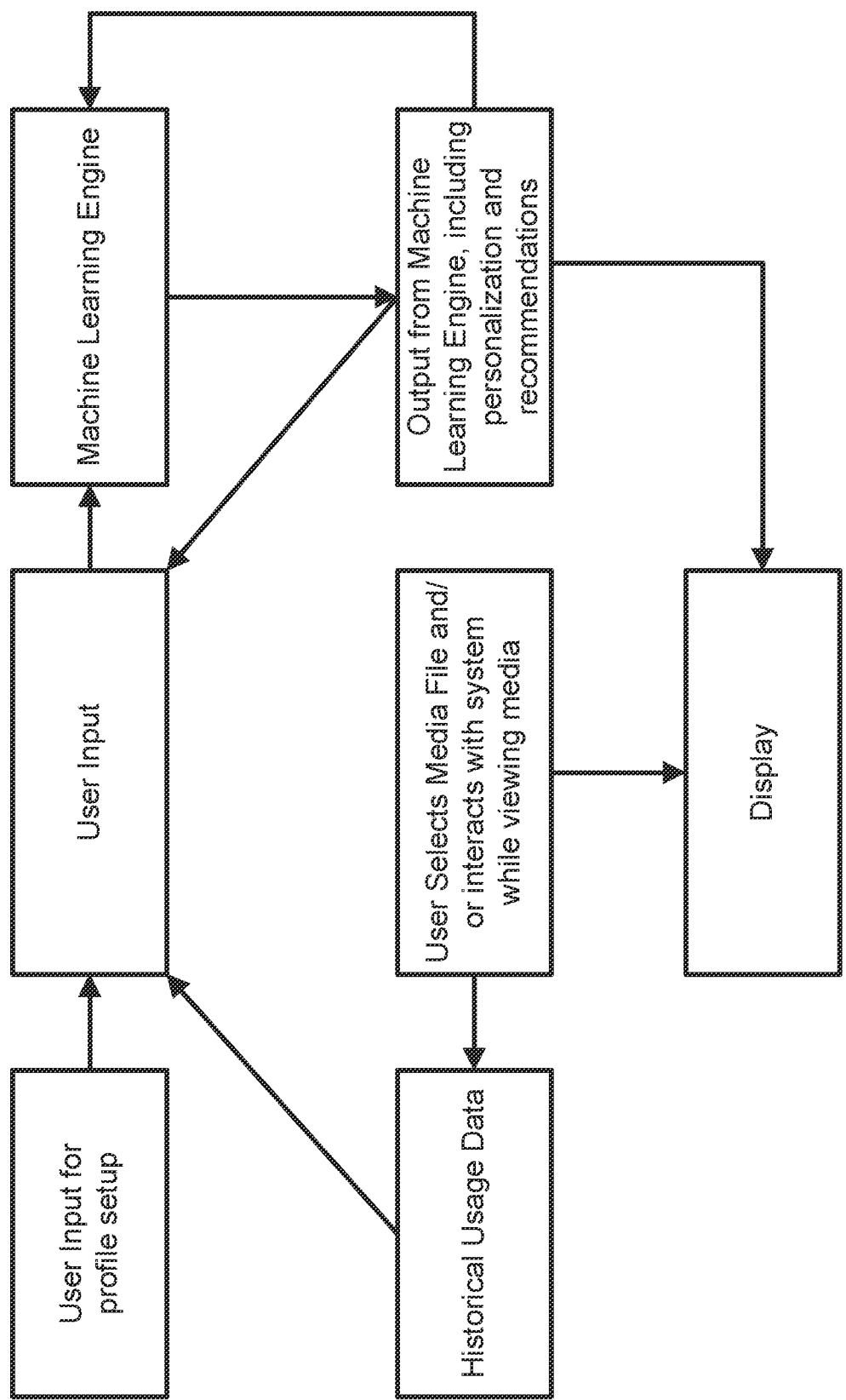
FIG. 13 shows a flow diagram describing the system depicted in an embodiment of the invention.

For example, FIG. 13 shows one embodiment of the invention. The user inputs information during the user registration process or at any time after the user has registered onto a platform. This information is part of the user profile. Upon setting up a user profile, the user may browse the platform and select a media file to view, which is then displayed to the user on a user interface. While viewing the media file, the user may be prompted to interact with the platform, including for example, by selecting to view more information about a product, or to purchase the product, among other possible options. The system captures and analyzes the user's interactions with the system, and this information, along with other instances in which the user has interacted with the system will be part of the historical data that becomes a part of the user profile. The information from the user profile is sent to one or more AI/ML engines. The AI/ML engines output additional information, including recommendations and personalizations, which are displayed to the user on the user interface. The output from the AI/ML engine is also part of a continuous feedback loop with the one or more AI/ML engines.

In some embodiments, the system includes a number of AI and ML engines with a plurality of recommenders and related personalization schemes. Each recommender/personalizer engine identifies a different type of reason for recommending and personalizing all items and interactions within the platform in a way that the user feels is properly curated to their specific interest, desires, and wants. In one example, each recommender/personalizer retrieves item preference data and generates candidate recommenders/personalizers responsive to a subset of that data that provides the user with a highly personalized item of interest that is either placed in their wish list for later consideration or is systematically acted upon in an immediate and appropriate way on behalf of the user based on their profile settings to do so. FIG. 3 shows an example of a UI demonstrating some of the above described options. For example, the right-hand portion of FIG. 3 displays clickable options for obtaining product information, purchasing the product while streaming content ("quick-buy"), adding to a cart, or adding to a wish list. Each of the icons and options may be added, deleted, edited, and/or otherwise customized based on the needs of the platform.

In another aspect of the invention, the system also includes AI/ML and modeling capabilities that are highly scalable and can generate billions of predictions daily, and serve those predictions in real-time and at high-throughput using powerful algorithms to create machine learning models by finding patterns in all collected data, to help determine and forecast predictive user patterns in support of personalization options and omni-channel opportunities. For example, the AI/ML engine may look at both structured and unstructured data. It may be comprised of a continuous iterative process learning from user preference data rather than through explicit programming. As the algorithms ingest training data, the AI/MI engine may produce more precise models based on that data and related hypothesis. The machine learning model or an enhancement to an existing model is the output generated. The AI/ML architecture enables models to train on data sets before being deployed. Some models are online and continuous, operating on the live data of the system, while others are off line where they continue to refine and improve on both the hypothesis as well as the related data algorithms for all aspects of the recommender and personalizers. This iterative process of online models leads to an improvement in the types of associations made between data elements. Due to their complexity and size, these patterns and associations can easily be overlooked by human observation. After a model has been trained, it can be used in real time (online) to learn from the system data. The improvements in accuracy are a result of the training process and automation that are part of the AI/ML process. The algorithms receive feedback from the data analysis, providing the user with the best recommendation and personalization outcomes based on their profile and historical interaction within the application platform. The system uses neural networks to help automatically infer rules for recognizing patterns that the network can more quickly learn more about to improve recommender/personalization accuracy.

In some embodiments, the recommender/personalizer engines also score and weight the candidate recommendations against a number of AI/ML models. The recommenders encompass a class of techniques and algorithms that suggest "relevant" items, content, opportunities, options, and markets to the user. The recommenders are generally divided into categories depending on a base hypothesis (one example of a hypothesis being that bourbon lovers overall or specifically are also those who also like BBQ and old American "muscle" cars). These collaborative filtering and content-based elements are modules of the architecture. The recommendations are built around items, whereas personalization is built around users' singular (individual) or combined (cohort) preferences. There is some overlap, but the more informed (through qualified internal and external data) and well designed and tuned the recommender engines/modules become the better the alignment accuracy to a user personalization the present methods become. The number of these modules is dependent on the types of recommender and personalizers needed for a particular category or group of categories of user or market needs. For example, different modules may be designed to examine data and make recommendations for spirits, cars, cigars, food, etc.

In certain cases, a normalization engine normalizes the scores of the candidate recommendation or personalization provided by the results from the models with a more contextual-normalization factor that is further or better aligned with the user or group of users profiles. Using normalization of the data results in reduced redundancy and improves the overall data integrity. The data may be further optimized to determine the best possible presentation to a broad set of users based on lead market categories within the users' profile. The purpose of the optimization is not to just seek the best presentation for each individual user aligned with their profile, but to also seek to provide optimization for the audience as a cohort group as related to the application layout/design, membership and shopping cart conversion workflow/pathing, product item opportunity, non-intrusive advertising integration as well as entertainment content structure and story lines.

Recommenders are used for decisions based on whole audience behaviors using approaches similar to those used in optimization models but applied to individual pieces of content, items, locations, etc. Built around a technique known as collaborative filtering, the recommender engines/modules compare similar sets of audiences (cohorts, users with similar profiles, etc.) in terms of trending, most popular, most likely to be user actionable (clicked, viewed, researched, purchased, most closely related to another item), for items, content, and opportunity for those users to interact. For example, the algorithms may find that a large percentage of users who buy a certain type of spirit or cocktail also frequently interact (watch, taste, buy) a particular content or item category and therefore the recommender will recommend those items together as part of users' interactive content viewing experience, search and checkout flow. As with optimization solutions, the recommendation solutions of the presently disclosed embodiments form suggestions based on behaviors across large, medium and smaller groups as a precursor to tailoring results for the individual user.

The personalization approach of the presently disclosed embodiments is used for tailoring results (content, product, interactions, user flows) to individuals. These resultants are combined with the aforementioned methods and architecture from the user's behavior within the application/platform over a period of time. Collected through the use of tracking scripts, user personalization provided data and interaction activity solutions, this data builds a comprehensive profile of each user over a period of time, and in some cases, creates detailed profiles of all the items and content available to users as well.

These item and content profiles serve as additional inputs in user profiles. For example, understanding the topicality of a set of items and content can inform the profile of a particular user who likes to consume the items and content about single malt scotch, automotive prices or Ireland. The profile also includes information about the geolocation, time of day, device, application, browser, etc. of an individual user. The system can also unify the interactive profile of an individual across multiple devices. All of this becomes additional data points that are used to create a personalized interaction with the user, which might include product, content, integrated minimally integrated advertisements or offers.

A recommendation/personalization candidate selector selects at least a portion of the candidate recommendations (based on the normalized scores and weight factors) into data combinational rules for recommendations/personalization to the user. The recommendation/personalization candidate selector also outputs the recommendations/personalization with associated reasons for the recommendation/personalization of the items to an associated neural network with a continuous, automated feedback loop which continues to refine the recommendations/personalization for each user.

In another aspect of the invention, the system includes common runtime services and libraries that power micro services on a cloud platform foundation and technology stack for the majority of the services, application libraries and application containers. These provide service discovery through distributed configuration, resilient and intelligent inter-process and service communications while providing reliability beyond single service calls, to isolate latency and fault tolerance at runtime.

In another aspect of the invention, the system also includes a robust set of Application Program Interfaces ("APIs") and Connective Integrations for technology and service partners that provide a unique experience to the user in the form of e-commerce, live interactive events, discovery services, content and other value-added opportunities without having to leave the environment.

In another aspect of the invention, the system also includes data persistence features, which allow storing and serving data in the cloud with the ability to handle significant amounts of data operations per day and support the growth of the user-base and the system.

In another aspect of the invention, the system also includes a Content Delivery Network ("CDN"), which allows routing traffic via global CDNs to deliver higher availability with a global presence.

In another aspect of the invention, the architecture for the entertainment system and method described above may be set-up using currently existing platforms, including Amazon's Web Services ("AWS") Cloud Computing Services, as well as currently existing technology platforms, such as the following frameworks: .NET, HTML, HTML Plus, Java, JavaScript, React, Ionic. For example, FIG. 2 shows an exemplary User Device User Interface (UI) utilizing AWS Route 53, AWS EC2 for elastic load balancing, and AWS S3.

What is claimed is:

1. A computerized method for providing entertainment and e-commerce to a user through a user interface of a computing device, the method comprising the steps of:
   retrieving user activity data and profile-provided data related to a user grouped in accordance with profile segments in relation to grouped cohort data;
   executing a machine learning model to evaluate in real time the grouped cohort data over a period of time, wherein the machine learning model comprises an associated neural network executed in real time on the grouped cohort data in a continuous, automated feedback loop;
   streaming media content on the user interface, wherein the media content includes at least one trigger therein; and
   when the trigger occurs in the media content, displaying on the user interface information curated in real time about a product or service that is available for purchase through the same user interface as the media content, wherein the information is curated based on the user activity data, the profile-provided data, and the evaluated cohort data,
   wherein the product or service is related to the streaming media content;
   wherein the streaming media content continues to be displayed in the user interface at the same time the information is being displayed; and wherein the user interface enables the user to perform an interactive function related to the product or service while the streaming media content continues to be displayed.

2. The method of claim 1, wherein the media content comprises a video.

3. The method of claim 1, wherein the product or service displayed comprises a product or service displayed in the streaming media content.

4. The method of claim 1, wherein the information is displayed in the user interface by providing a display gradient over a portion of the user interface that highlights the information while still allowing the user to view the media content.

5. The method of claim 4, wherein the display gradient incrementally increases or decreases in opacity across the user interface.

6. The method of claim 5, wherein the display gradient comprises a top layer overlay in the user interface, the top layer overlay having a color that becomes increasingly darker across the user interface.

7. The method of claim 1, wherein the interactive function is selected from the group consisting of: purchase the product or service, add the product or service to a virtual shopping cart, add the product or service to a wish list, or add the product or service to a virtual folder, which can later be viewed by the user for later decision-making.

8. The method of claim 1, wherein the product or service is chosen at least in part based upon information supplied by the user.

9. The method of claim 8, wherein the information is selected from the group consisting of: user name, user address, user birthdate, user age, user astrological sign, user financial budget, user location, user ethnicity, user travel preferences, user pet preferences, user music interests, user drink preferences, and user food preferences.

10. The method of claim 1, wherein the product or service is chosen based at least in part on at least one component part of a product appearing in the media content.

11. A system for providing entertainment and e-commerce to a user, comprising:
   A server coupled to a processor, and configured to execute instructions that:
   retrieve user activity data and profile-provided data related to a user grouped in accordance with profile segments in relation to grouped cohort data;
   execute a machine learning model to evaluate in real time the grouped cohort data over a period of time, wherein the machine learning model comprises an associated neural network executed in real time on the grouped cohort data in a continuous, automated feedback loop;
   stream media content to a user interface of a user device, wherein the media content includes at least one trigger therein; and
   when the trigger occurs in the media content, the server causes to be displayed on the user interface information curated in real time about a product or service that is available for purchase through the same user interface as the media content, wherein the information is curated based on the user activity data, the profile-provided data, and the cohort data,
   wherein the product or service is related to the streaming media content;
   wherein the streaming media content continues to be displayed in the user interface at the same time the information is being displayed; and
   wherein the user interface enables the user to perform an interactive function related to the product or service while the streaming media content continues to be displayed.

12. The system of claim 11, wherein the media content comprises a video.

13. The system of claim 11, wherein the product or service displayed comprises a product or service displayed in the streaming media content.

14. The system of claim 11, wherein the information is displayed in the user interface by providing a display gradient over a portion of the user interface that highlights the information while still allowing the user to view the media content.

15. The system of claim 14, wherein the display gradient incrementally increases or decreases in opacity across the user interface.

16. The system of claim 15, wherein the display gradient comprises a top layer overlay in the user interface, the top layer overlay having a color that becomes increasingly darker across the user interface.

17. The system of claim 11, wherein the interactive function is selected from the group consisting of: purchase the product or service, add the product or service to a virtual shopping cart, add the product or service to a wish list, or add the product or service to a virtual folder, which can later be viewed by the user for later decision-making.

18. The system of claim 11, wherein the product or service is chosen at least in part based upon information supplied by the user.

19. The system of claim 18, wherein the information is selected from the group consisting of: user name, user address, user birthdate, user age, user astrological sign, user financial budget, user location, user ethnicity, user travel preferences, user pet preferences, user music interests, user drink preferences, and user food preferences.

20. The system of claim 11, wherein the product or service is chosen based at least in part on at least one component part of a product appearing in the media content.

* * * * *